United States Patent
Silva et al.

(10) Patent No.: US 10,743,599 B2
(45) Date of Patent: Aug. 18, 2020

(54) SUPPORT FOR A LIGHTING ELEMENT ON A SAFETY HELMET, ADJUSTABLE LIGHTING SYSTEM, AND CABLE RETENTION ARRANGEMENT

(71) Applicant: MSA do Brasil Equipamentos e Instrumentos de Segurança Ltda., Diadema (BR)

(72) Inventors: Luciano Silva, Diadema (BR); Gabriel De Marchi, Diadema (BR); Daniel Stegun, Diadema (BR); Loren Pearson, Gauteng (ZA)

(73) Assignee: MSA do Brasil Equipamentos e Instrumentos de Segurança Ltda., Diadema (BR)

( * ) Notice: Subject to any disclaimer, the term of this patent is extended or adjusted under 35 U.S.C. 154(b) by 0 days.

(21) Appl. No.: 15/520,512

(22) PCT Filed: Sep. 3, 2015

(86) PCT No.: PCT/BR2015/050139
§ 371 (c)(1),
(2) Date: Apr. 20, 2017

(87) PCT Pub. No.: WO2016/033670
PCT Pub. Date: Mar. 10, 2016

(65) Prior Publication Data
US 2017/0303619 A1    Oct. 26, 2017

(30) Foreign Application Priority Data
Sep. 4, 2014 (BR) .......................... 1020140218688

(51) Int. Cl.
*A42B 3/04* (2006.01)
*F21V 15/04* (2006.01)
(Continued)

(52) U.S. Cl.
CPC ............... *A42B 3/044* (2013.01); *A42B 3/04* (2013.01); *F21V 15/04* (2013.01); *G02B 6/0001* (2013.01);
(Continued)

(58) Field of Classification Search
CPC .......... A42B 3/00; A42B 3/044; A42B 1/244; F21V 21/084; F21V 21/088; F21V 21/085; F21V 21/0885; F21L 14/00
See application file for complete search history.

(56) References Cited

U.S. PATENT DOCUMENTS 3,069,539 A    12/1962  Kidd
3,302,018 A  *  1/1967  Harding ................. A42B 3/044
                                                 362/106
(Continued)

FOREIGN PATENT DOCUMENTS

ZA             9800451 B     7/1998

*Primary Examiner* — Peggy A Neils
(74) *Attorney, Agent, or Firm* — The Webb Law Firm

(57) ABSTRACT

A support for mounting at least one lighting element on a safety helmet, the support comprising a body having: (i) at least one helmet attaching portion configured for directly or indirectly connecting the support to a portion of the safety helmet, and (ii) a plurality of lighting element attaching portions configured for directly or indirectly connecting the at least one lighting element to the support, wherein the plurality of lighting element attaching portions are configured to facilitate the attachment of the at least one lighting element in a corresponding plurality of positions, such that light projected from the at least one lighting element is focused or directed at a plurality of corresponding angles. An adjustable lighting system and a cable retention arrangement for a safety helmet are also disclosed.

19 Claims, 3 Drawing Sheets

(51) Int. Cl.
*F21V 8/00* (2006.01)
*F21Y 115/10* (2016.01)
*A42B 3/00* (2006.01)
*F21V 15/00* (2015.01)

(52) U.S. Cl.
CPC ............... *A42B 3/00* (2013.01); *F21V 15/00* (2013.01); *F21Y 2115/10* (2016.08)

(56) References Cited

U.S. PATENT DOCUMENTS

| | | | | |
|---|---|---|---|---|
| 4,156,942 A * | 6/1979 | Isfeld | ....................... | A42B 1/10 |
| | | | | 2/422 |
| 4,199,802 A * | 4/1980 | Malm | .................... | A42B 3/044 |
| | | | | 362/105 |
| 4,263,588 A * | 4/1981 | Gautier | ................ | G08B 17/117 |
| | | | | 340/321 |
| 4,521,831 A * | 6/1985 | Thayer | .................... | A42B 3/044 |
| | | | | 2/422 |
| 4,530,112 A * | 7/1985 | Cecala | ................. | A42B 3/0446 |
| | | | | 2/422 |
| 5,034,747 A * | 7/1991 | Donahue | .............. | A42B 3/0433 |
| | | | | 2/410 |
| 5,329,637 A * | 7/1994 | Walker | .................... | A42B 3/044 |
| | | | | 2/5 |
| 6,616,294 B1 | 9/2003 | Henry | | |
| 8,403,515 B2 * | 3/2013 | Eichelberger | .............. | F21L 4/00 |
| | | | | 362/106 |
| 8,992,039 B2 * | 3/2015 | Janice | ....................... | F21L 4/02 |
| | | | | 362/105 |
| 2005/0174753 A1* | 8/2005 | Cao | ........................ | A42B 3/044 |
| | | | | 362/106 |
| 2011/0188236 A1 | 8/2011 | Eichelberger et al. | | |

* cited by examiner

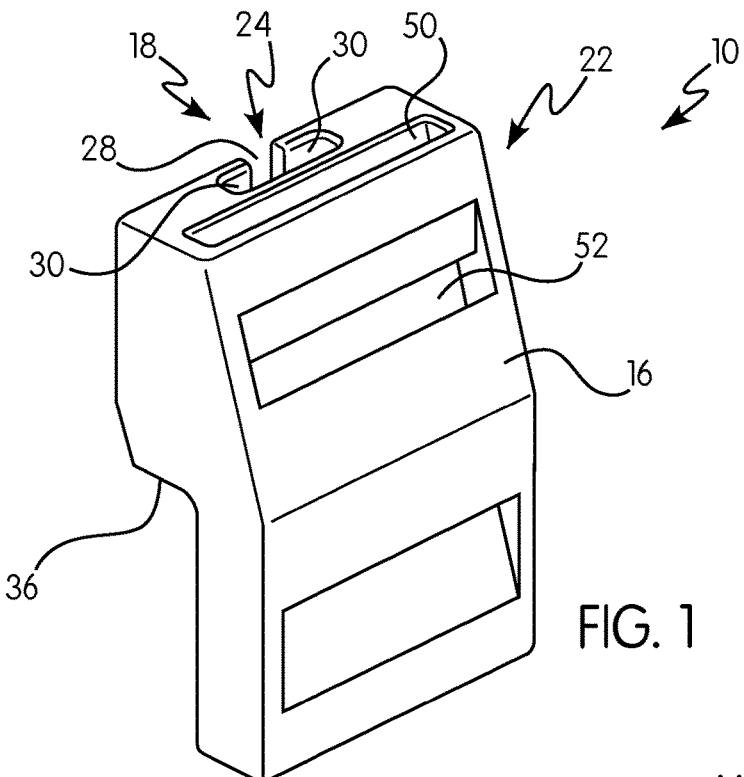
FIG. 1
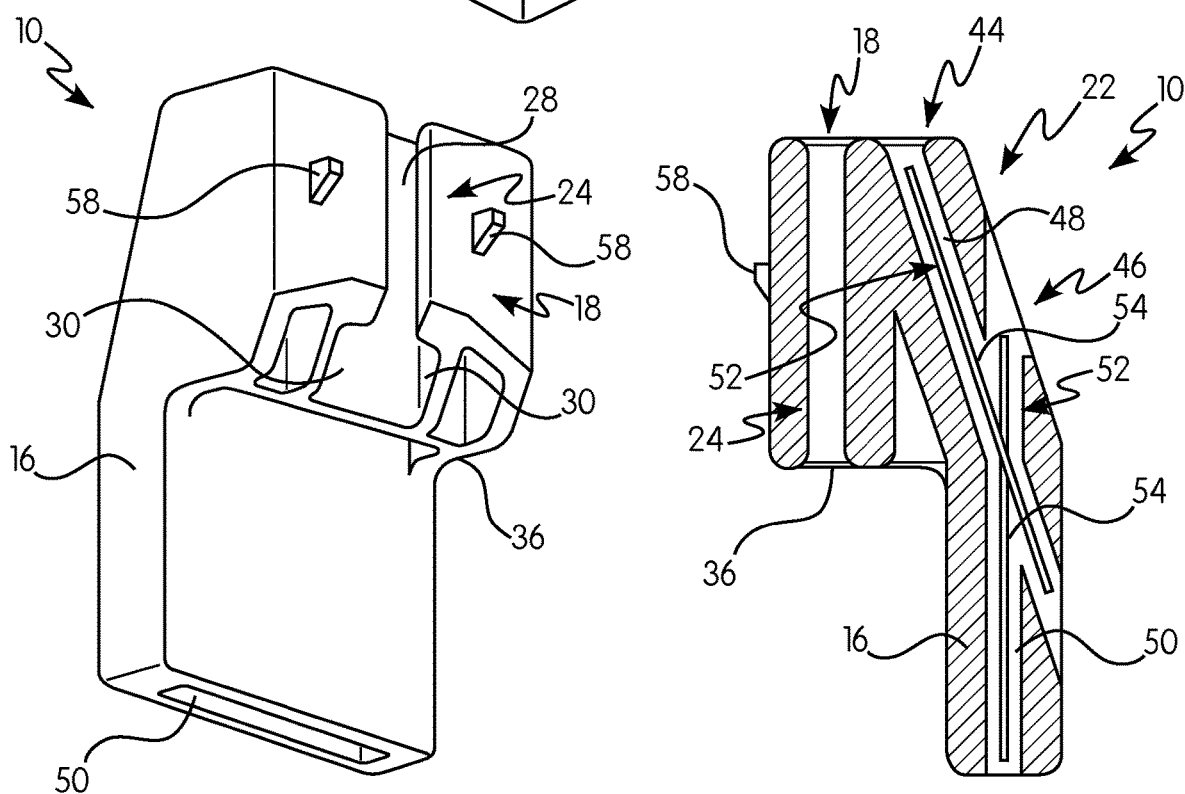
FIG. 2
FIG. 3

SUPPORT FOR A LIGHTING ELEMENT ON A SAFETY HELMET, ADJUSTABLE LIGHTING SYSTEM, AND CABLE RETENTION ARRANGEMENT

CROSS REFERENCE TO RELATED APPLICATIONS

This application claims priority to Brazilian Patent Application No. 10 2014 021868-8 filed Sep. 4, 2014, the disclosure of which is hereby incorporated by reference for all purposes in its entirety.

BACKGROUND OF THE INVENTION

Field of the Invention

The present invention relates generally to safety equipment, such as a safety helmet or the like, and in particular to a support for mounting a lighting element on a safety helmet, an adjustable lighting system for a safety helmet having such a support, and a retention arrangement for a cable of such a lighting element on the safety helmet.

Description of the Related Art

Various activities and work environments that require that a user wears a safety helmet may also further require the use of some lighting system or element. For example, such a safety helmet having a lighting element is used in mining activities; not only as a safety item, but also to allow its user to reasonably see in an environment of little or no light at all. In addition, such safety helmets are also commonly used in construction sites, even in areas provided with lighting towers and posts, to provide improved lighting in the local working environment of the user. With particular reference to a mining activity, a user needs a safety helmet to perform his/her activities in a reduced visibility environment, as well as in environments with the risk of harmful injury and damage due to landslides and ground or ceiling caving.

According to previously-conducted studies, basic lighting requirements may be fulfilled by providing two different angular positions of the focus of a lighting element or source. In the first of these angularly-different positions, the focus or direction of the at least one lighting element points to an area in front of the user for everyday activities and, in the second of these angularly-different positions, the focus or direction of the at least one lighting element or source points to an area closer and over the floor or to an area closer to his/her hands.

As is known, certain safety helmets are provided with lighting elements fixedly positioned on their front portion in such a manner that the focus of the at least one lighting element, whether generated by electricity or by combustion, is normally and substantially directed towards the front of the user, i.e., substantially parallel to the surface on which the user is standing. In this fixed position, the lighting element illuminates a medium to short distance in front of the user, which compels the user, when the illumination nearer and over the floor or nearer his/her hands is required, to necessarily (i) position his/her head in the direction that he/she wishes to light (which can be risky and, in the long term, even cause harmful injury and damage due to repetitive effort), or (ii) modify the position of the safety helmet on his/her head, which may lead to the incorrect or non-compliant positioning of the safety helmet of the user.

As is also known, certain safety helmets are designed to provide better lighting efficiency and improved energy economy. However, such safety helmets do not provide any improved focus adjustability of the lighting element. Even in those instances where the safety helmet is provided with modern lighting elements, such as, for example, long-life sources of energy and/or light emitting diode (LED) lights, beneficial lighting focus or adjustability is only available if the user modifies the position of the helmet on the user's head, which, again, often results in the incorrect or non-compliant use of the safety helmet. Certain existing safety helmets include light elements mounted on the frontal part of the body of the safety helmet through the use of a support member over a portion of the body of the helmet, which requires drilling through the body of the helmet (which may interfere and damage the dielectric condition of the helmet).

One particular safety helmet is shown and described in South African Patent Application No. 98/00451, which describes a safety helmet comprising an outer body of the helmet manufactured with a plastic material having an suitable resistance, and a head support arrangement for positioning the body of the helmet over the head of the user, where the body of the helmet is molded in such a manner as to provide a fitting for mounting a lighting element, such as a safety flashlight, on a frontal position of the helmet. Additionally, the body of this safety helmet is also provided with a support manufactured from a plastic material for the purpose of fixing the electric cable up to the lighting element. This support is composed of two parts in which the first part is integrally formed on the body of the helmet and the second part is a hooking member in which the internal part the electric cable is passed through having a fixing portion for the fitting to the first part.

As described in this South African patent application, the safety helmet has a typical structure for a hard hat that is used in mining activities, wherein certain structural arrangements are provided for the fixing and the powering of the flashlight positioned on the frontal part of the safety helmet. These very arrangements are important and, commonly, are part of the international safety policies and regulations such as, for instance, the South African Rule SANS 1438 (Ed. 1 (1987/R11998)—Health Light Assemblies for Miners—Part 5: Helmet Light Assemblies), the content of which is hereby incorporated by reference in its entirety.

Therefore, as it can be observed and noted from the above-discussed description of the state of the art, the presently-known safety helmets do not provide for a possibility of adjusting the focus or direction of the lighting element between positions without the need to change the correct positioning of the safety helmet of the user.

SUMMARY OF THE INVENTION

Generally, provided is an improved support for a lighting element of a safety helmet, an improved adjustable lighting system for a safety helmet, and an improved cable fixing system for such a lighting element. Preferably, provided is a support for a lighting element on a safety helmet that facilitates the adjustment of the focus or direction of the lighting element between positions without the need to modify the correct positioning of the safety helmet by the user. Preferably, provided is a support for mounting a lighting element on a safety helmet wherein the body of the helmet does not need to be perforated or punctured, thereby preserving its dielectric isolating condition. Preferably, provided is a support for mounting a lighting element on a safety helmet that is manufactured from a plastic material in such a manner that it exhibits minimal or no wear-and-tear to the body of the helmet. Preferably, provided is a support for mounting a lighting element on a safety helmet wherein, if the plastic support is broken due to an impact of the lighting element against an external body, the integrity of the body of the helmet is not affected.

In one preferred and non-limiting embodiment or aspect, provided is a support for mounting at least one lighting element on a safety helmet, the support comprising a body having: (i) at least one helmet attaching portion configured for directly or indirectly connecting the support to a portion of the safety helmet, and (ii) a plurality of lighting element attaching portions configured for directly or indirectly connecting the at least one lighting element to the support, wherein the plurality of lighting element attaching portions are configured to facilitate the attachment of the at least one lighting element in a corresponding plurality of positions, such that light projected from the at least one lighting element is focused or directed at a plurality of corresponding angles.

In one preferred and non-limiting embodiment or aspect, the at least one helmet attaching portion comprises at least one slot configured to be removably attachable to at least one attachment structure formed on or attached to the safety helmet. In another preferred and non-limiting embodiment or aspect, the at least one slot is a substantially "T"-shaped slot arrangement defined by a center slot portion and two wing slot portions. In a further preferred and non-limiting embodiment or aspect, the at least one attachment structure is a substantially "T"-shaped projection arrangement defined by a center portion and two wing portions, wherein the support is attachable to the safety helmet by aligning and sliding the "T"-shaped projection arrangement over and along the "T"-shaped slot arrangement. In another preferred and non-limiting embodiment or aspect, the at least one helmet attaching portion of the support comprises a step portion configured to contact an abutment portion of the at least one attachment structure, such that the at least one slot is positioned over and slid along at least a portion of the at least one attachment structure until the step portion contacts the abutment portion.

In one preferred and non-limiting embodiment or aspect, the plurality of lighting element attaching portions comprise at least one slot extending at least partially through the body of the support, wherein the at least one slot is configured to receive a support attaching portion of the at least one lighting element at least partially therein, such that the at least one lighting element is removably attachable to the support.

In one preferred and non-limiting embodiment or aspect, the plurality of lighting element attaching portions comprise: a first lighting element attaching portion configured to facilitate the attachment of the at least one lighting element in a first position, such that the light projected from the at least one lighting element is focused or directed at a first angle; and a second lighting element attaching portion configured to facilitate the attachment of the at least one lighting element in a second position, such that the light projected from the at least one lighting element is focused or directed at a second angle. In another preferred and non-limiting embodiment or aspect, the first angle is in the range of about 60° to about 80° with respect to the horizontal plane of vision, and the second angle is in the range of about 80° to about 90° with respect to the horizontal plane of vision. In another preferred and non-limiting embodiment or aspect, the first lighting element attaching portion comprises at least one slot extending at least partially through the body of the support, wherein the at least one slot is configured to receive a support attaching portion of the at least one lighting element at least partially therein, such that the at least one lighting element is removably attachable in the first position, and wherein the second lighting element attaching portion comprises at least one slot extending at least partially through the body of the support, wherein the at least one slot is configured to receive a support attaching portion of the at least one lighting element at least partially therein, such that the at least one lighting element is removably attachable in the second position.

In one preferred and non-limiting embodiment or aspect, at least one of the plurality of lighting element attaching portions comprises at least one friction element configured to facilitate the retention of the at least one lighting element by the support. In another preferred and non-limiting embodiment or aspect, at least one of the plurality of lighting element attaching portions comprises at least one slot extending at least partially through the body of the support, and wherein the at least one friction element comprises at least one projection projecting from a surface at least partially defining the at least one slot.

In one preferred and non-limiting embodiment, the helmet attaching portion further comprises at least one projection extending or projecting from a surface of the support and configured to at least partially interact with a corresponding notch on a surface of at least one attachment structure formed on or attached to the safety helmet, such that the when the support is attached to the at least one attachment structure, the at least one projection will at least partially fit into the corresponding notch, thereby retaining the support to the safety helmet via the at least one attachment structure.

In one preferred and non-limiting embodiment or aspect, provided is an adjustable lighting system for a safety helmet having a body with an outer surface, the system comprising: at least one lighting element configured to focus or direct light therefrom; at least one attachment structure formed on or attached to the outer surface of the safety helmet; and a support for the at least one lighting element, the support comprising a body having: (i) at least one helmet attaching portion configured for directly or indirectly connecting the support to the at least one attachment structure, and (ii) a plurality of lighting element attaching portions configured for directly or indirectly connecting the at least one lighting element to the support, wherein the plurality of lighting element attaching portions are configured to facilitate the attachment of the at least one lighting element in a corresponding plurality of positions, such that light projected from the at least one lighting element is focused or directed at a plurality of corresponding angles.

In one preferred and non-limiting embodiment or aspect, the at least one attachment structure is formed or molded on the outer surface of the safety helmet.

In one preferred and non-limiting embodiment or aspect, the at least one lighting element comprises a support attaching portion configured to interact with each of the plurality of lighting element attaching portions, such that the at least one lighting element is removably attachable between the plurality of positions on the support. In another preferred and non-limiting embodiment or aspect, the plurality of lighting element attaching portions comprise at least one slot extending at least partially through the body of the support, wherein the at least one slot is configured to receive the support attaching portion of the at least one lighting element at least partially therein, such that the at least one lighting element is removably attachable to the support. In a further preferred and non-limiting embodiment or aspect, the support attaching portion comprises at least one projection configured to slide at least partially within the at least one slot.

In one preferred and non-limiting embodiment or aspect, provided is a cable retention arrangement for a safety helmet having a body, the cable retention arrangement comprising at least one cable opening formed on or in at least a portion of the body of the safety helmet and configured to facilitate passage of the cable therethrough for connection to at least one electronic device.

In one preferred and non-limiting embodiment or aspect, the arrangement further comprises at least one sleeve member formed on or attached to the body of the safety helmet and configured to retain and facilitate passage of the cable therethrough. In another preferred and non-limiting embodiment or aspect, the arrangement comprises a plurality of sleeve members, wherein the plurality of sleeve members are spaced and aligned along a portion of the body of the safety helmet. In one preferred and non-limiting embodiment or aspect, the at least one electronic device is at least one lighting element.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 1 is a front perspective view of one embodiment or aspect of a support for a lighting element of a safety helmet according to the principles of the present invention;

FIG. 2 is a rear perspective view of the support shown in FIG. 1;

FIG. 3 is a lateral cross-sectional view of the support shown in FIG. 1;

DETAILED DESCRIPTION OF THE INVENTION

Figure 4:
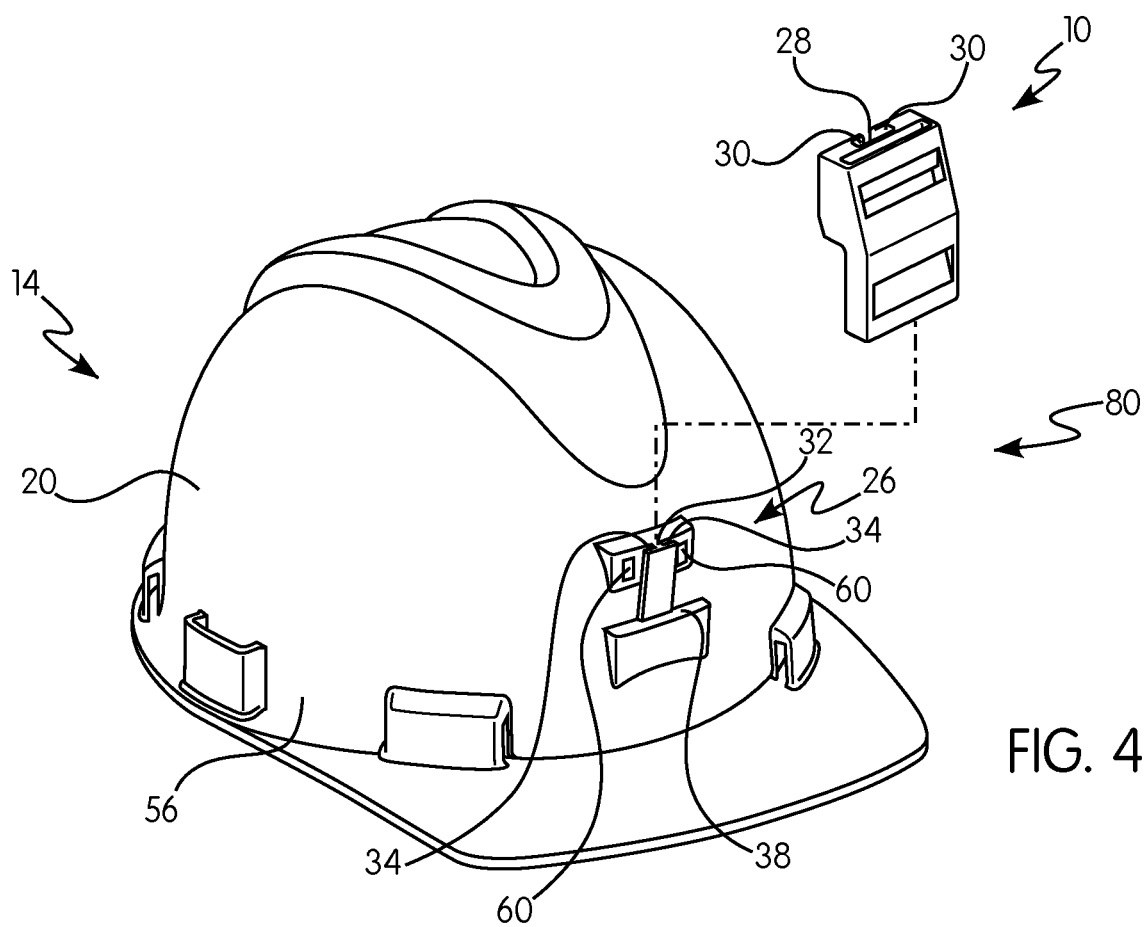
FIG. 4 is a perspective view of one embodiment or aspect of an attaching structure for attaching the support shown in FIG. 1 to a safety helmet.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention relates to a support 10 for mounting at least one lighting element 12 on a safety helmet 14, as shown in various views and preferred and non-limiting embodiments in FIGS. 1-7. With specific reference to FIGS. 1-3, and in one preferred and non-limiting embodiment or aspect, the support 10 includes a body 16, which may be a molded, plastic material. This body 16 includes at least one helmet attaching portion 18, which is sized, shaped, or configured for facilitating the direct or indirect connection or attachment of the support 10 to a portion of a body 20 (e.g., an outer shell) of the safety helmet 14 (with a head support arrangement (not shown) therein for properly positioning the safety helmet 14). Further, the body 16 of the support 10 includes a plurality of lighting element attaching portions 22, each of which are sized, shaped, or configured to facilitate the direct or indirect connection or attachment of the at least one lighting element 12 to the support 10. In this embodiment, the plurality of lighting element attaching portions 22 are sized, shaped, or configured to facilitate the connection or attachment of the at least one lighting element 12 in a corresponding plurality of positions, such that light illuminated by or projected from the at least one lighting element 12 is focused or directed at a plurality of corresponding angles (or towards a plurality of general areas in front of the user). For example, each position may correspond to a general direction or area that may be of interest to the user in a low-light environment, e.g., light focused or directed towards the ceiling, light focused or directed to an area in front of the user, light focused or directed to the ground area in front of the user, light directed or focused towards the user's hands and/or feet, or the like.

In one preferred and non-limiting embodiment, the at least one helmet attaching portion 18 is in the form of or includes at least one slot 24 that extends partially or fully through a portion of the body 16 of the support 10. This at least one slot 24 is sized, shaped, or configured to be removably attachable to or over, or otherwise interact with, at least one attachment structure 26 formed on (such as by molding) or attached to (such as by an adhesive) the body 20 the safety helmet 14. In one preferred and non-limiting embodiment, at least a portion of the at least one attachment structure 26 includes a projection or other part that is sized, shaped, or configured to interact with the at least one slot 24. However, it should also be recognized that the at least one attachment structure 26 may include such a slot, and the helmet attaching portion 18 may be in the form of a mating or interacting projection. The use of this slot 24/attachment structure 26 arrangement allows for the easy and removable attachment of the support 10 to the safety helmet 14.

In one preferred and non-limiting embodiment, and as best illustrated in FIGS. 1 and 2, the at least one slot 24 is a substantially "T"-shaped slot arrangement defined by a center slot portion 28 and two wing slot portions 30. Further, in this embodiment, at least a portion the at least one attachment structure 26 is formed in a corresponding substantially "T"-shaped projection arrangement defined by a center portion 32 and two wing portions 34. In this manner, the support 10 is attachable to the safety helmet 14 by aligning and sliding the "T"-shaped slot arrangement over and along the "T"-shaped projection arrangement, i.e., aligning: (i) the center slot portion 28 of the at least one slot 24 with the center portion 32 of the at least one attachment structure 26; and (ii) the wing slot portions 30 of the at least one slot 24 with the wing portions 34 of the at least one attachment structure—and mating or sliding the parts together. It is also envisioned that the at least one slot 24 and at least a portion of at least one attachment structure 26 may be shaped or configured in any way so as to facilitate removable attachment of the support 10 to the safety helmet 14.

Figure 5:
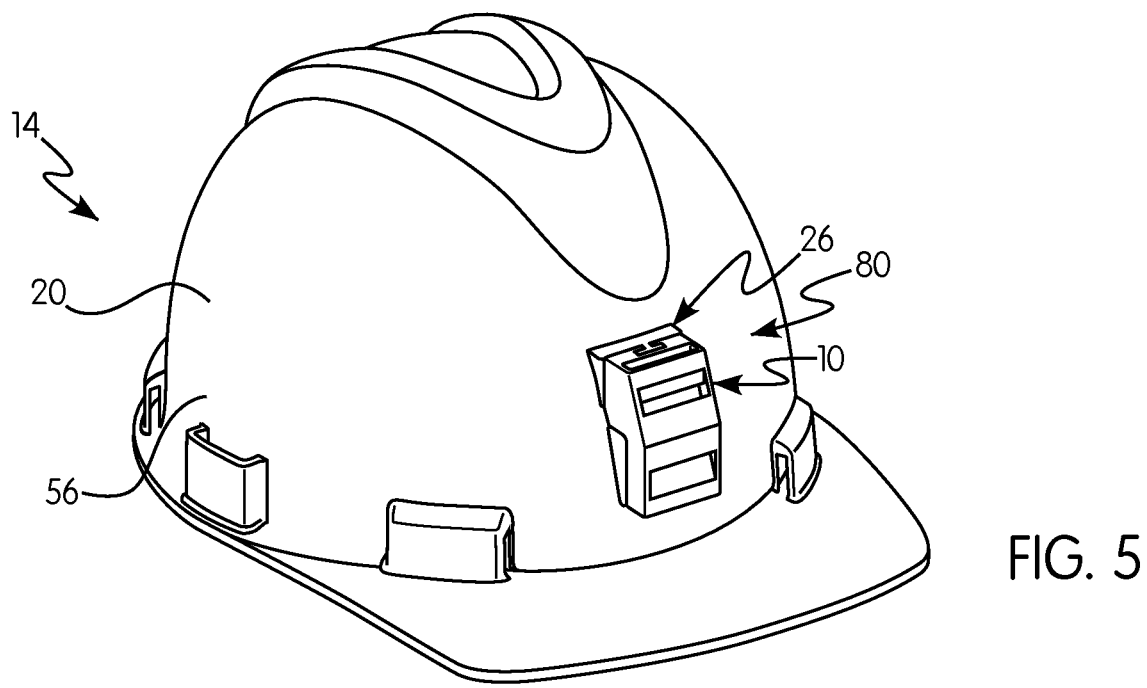
FIG. 5 is a perspective view of the support shown in FIG. 1 attached to the safety helmet via the attaching structure of FIG. 4.

In one preferred and non-limiting embodiment, and as best seen in FIGS. 4 and 5, the at least one helmet attaching portion 18 of the support 10 includes a step portion 36 configured to contact an abutment portion 38 of the at least one attachment structure 26. In operation, and when the at least one slot 24 (or other portion of the helmet attaching portion 18) is positioned over and slid along (or otherwise engaged with) at least a portion of the at least one attachment structure 26, the step portion 36 will contact the abutment portion 38. This will ensure that the support 10 is properly seated on at least one attachment structure 26, and thus, properly positioned on the safety helmet 14.

Figure 6:
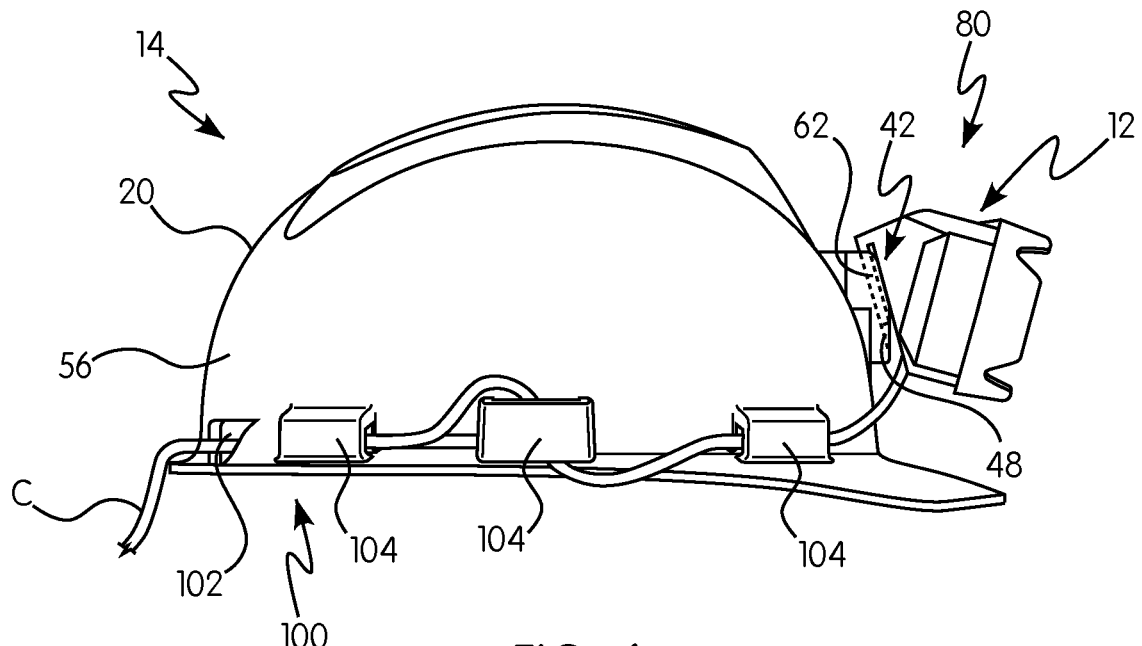
FIG. 6 is a side view of the support shown in FIG. 1, where the support provides a first angular position.
Figure 7:
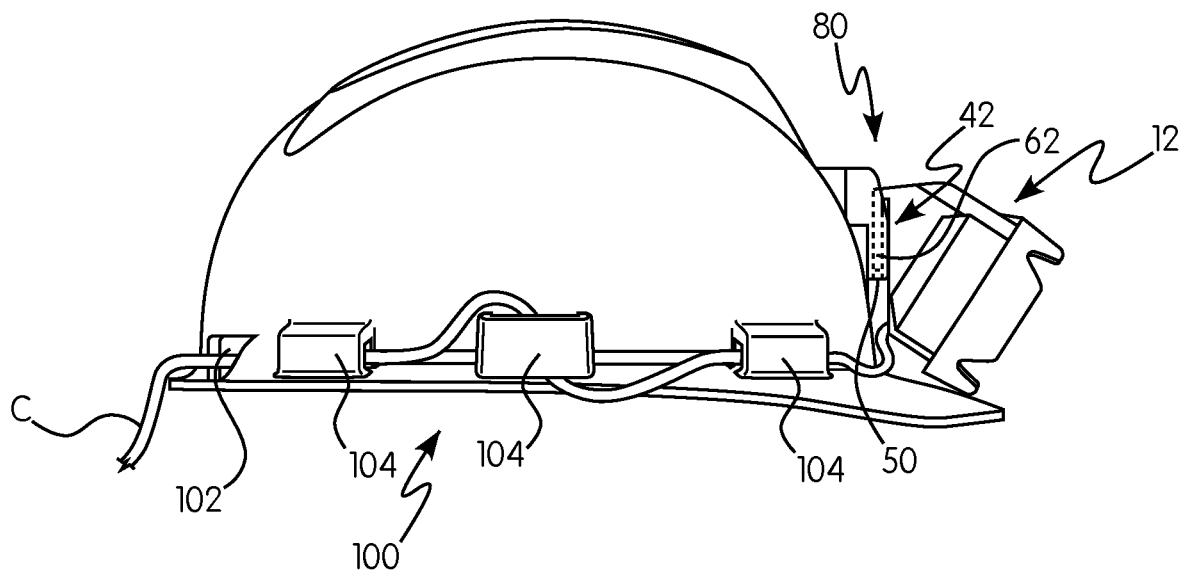
FIG. 7 is a side view of the support shown in FIG. 1, where the support provides a second angular position.

In one preferred and non-limiting embodiment, and with reference to FIGS. 3, 6, and 7, the plurality of lighting element attaching portions 22 are in the form of at least one slot 48 extending at least partially through the body 16 of the support 10. This at least one slot 48 is sized, shaped, or configured to receive a support attaching portion 42 of the at least one lighting element 12 at least partially therein, such that the at least one lighting element 12 is removably attachable to the support. For example, this support attaching portion 42 may be an elongate member, leg, or projection 62 that is sized, shaped, or configured to slide within the at least one slot 48, and based upon this slot/projection connection, the at least one lighting element 12 is rigidly connected to the support 10 with the light from the at least one lighting element 12 to shine or illuminate in a desired direction with respect to the user's safety helmet 14.

As shown in FIG. 3, and in one preferred and non-limiting embodiment, the plurality of lighting element attaching portions 22 include: a first lighting element attaching portion 44 sized, shaped, or configured to facilitate the attachment of the at least one lighting element 12 in a first position (see FIG. 6), such that the light projected from the at least one lighting element 12 is focused or directed at a first angle (or towards an first area in front of the user); and a second lighting element attaching portion 46 sized, shaped, or configured to facilitate the attachment of the at least one lighting element 12 in a second position (see FIG. 7), such that the light projected from the at least one lighting element 12 is focused or directed at a second angle (or towards an first area in front of the user). In one preferred and non-limiting embodiment, the first angle is in the range of about 60° to about 80° with respect to the horizontal plane of vision, and the second angle is in the range of about 80° to about 90° with respect to the horizontal plane of vision. In another preferred and non-limiting embodiment, the first angle is about 75° and the second angle is about 90°. Of course, any angle may obtained based upon the orientation of and relative positioning between the support attaching structure 42 (e.g., the member, leg, or projection 62) of the at least one lighting element 12 and the light element attaching portions 18.

In one preferred and non-limiting embodiment, the first lighting element attaching portion 44 is in the form of at least one slot 48 extending at least partially through the body 16 of the support 10, and this at least one slot 48 is sized, shaped, or configured to receive a support attaching portion 42 (e.g., a member, leg, or projection 62) of the at least one lighting element 12 at least partially therein, such that the at least one lighting element 12 is removably attachable in the first position. Further in this embodiment, the second lighting element attaching portion 46 is in the form of at least one slot 50 extending at least partially through the body 16 of the support 10, and this at least one slot 50 is sized, shaped, or configured to receive a support attaching portion 42 (e.g., a member, leg, or projection 62) of the at least one lighting element 12 at least partially therein, such that the at least one lighting element 12 is removably attachable in the second position. It should be recognized that any number of lighting element attachment portions 22 (which may be in the form of slots) may be used in connection with the support 10, such that the at least one lighting element 12 can be removably positioned in a corresponding number of positions.

In one preferred and non-limiting embodiment, at least one of the plurality of lighting element attaching portions 22 includes at least one friction element 52 that is sized, shaped, or configured to facilitate the retention of the at least one lighting element 12 by or in the support 10. In one preferred and non-limiting embodiment, this at least one friction element 52 is in the form of at least one projection 54 extending or projecting from a surface of the lighting element attaching portions 22, such as at least one projection 54 extending or projecting from an inner wall of the at least one slot 48 and/or the at least one slot 50. Such projections will facilitate the frictional engagement and/or pressure fitting of the support attaching portion 42 (e.g., a member, leg, or projection 62) of the at least one lighting element 12 to or within the lighting element attaching portions 22, which will prevent the accidental removal or disengagement of the at least one lighting element 12 and the support 10. Further, this at least one projection 54 may be in the form of a notch, a rib, a coated surface, a roughened surface, a flexible member, a rubber member, or the like.

In one preferred and non-limiting embodiment, the helmet attaching portion 18 of the support 10 includes least one projection 58 extending or projecting from a surface of the support 10. This at least one projection 58 is sized, shaped, or configured to at least partially interact with a corresponding notch 60 on a surface of at least one attachment structure 26. When the support 10 is attached to the at least one attachment structure 26 (such as by sliding the at least one slot 24 over a portion of the at least one attachment structure 26), the at least one projection 58 will at least partially fit into the corresponding notch 60, thereby retaining the support 10 to the safety helmet 14 via the at least one attachment structure 26. The at least one projection 58 and corresponding notch 60 may be sized or shaped so that, while the support 10 is generally securely attached to the at least one attachment structure 26 (based upon the projection/notch interaction), the user can still urge the at least one projection 58 out of seating in the corresponding notch 60 to remove the support 10, such as for maintenance of the support 10 and/or the at least one attachment structure 26. As illustrated in FIGS. 2 and 4, and in one preferred and non-limiting embodiment, the support 10 may include two projections 58 with a corresponding two notches 60.

In one preferred and non-limiting embodiment, provided is an adjustable lighting system 80 for a safety helmet 14 having a body 20 (e.g., an outer shell) with an outer surface 56. The system 80 includes: at least one lighting element 12 configured to focus or direct light therefrom; at least one attachment structure 26 formed on or attached to the outer surface 56 of the safety helmet 14; and a support 10 for the at least one lighting element 12. In this embodiment, the support 10 includes a body 16 having: (i) at least one helmet attaching portion 18 sized, shaped, or configured for directly or indirectly connecting the support 10 to the at least one attachment structure 26, and (ii) a plurality of lighting element attaching portions 22 configured for directly or indirectly connecting the at least one lighting element 12 to the support 10, wherein the plurality of lighting element attaching portions 22 are sized, shaped, or configured to facilitate the attachment of the at least one lighting element 12 in a corresponding plurality of positions, such that light projected from the at least one lighting element 12 is focused or directed at a plurality of corresponding angles (or towards a plurality of areas in front of the user). In one embodiment, the at least one attachment structure 26 is formed or molded on the outer surface 56 of the safety helmet 14.

In one preferred and non-limiting embodiment, and as best illustrated in FIGS. 6 and 7, provided is a cable retention arrangement 100 for a safety helmet 14 having a body 20, where the cable retention arrangement 100 is configured to retain or hold a cable (C) on or near the safety helmet 14 and the cable (C) is used to deliver power to at least one electronic device, such as the above-discussed at least one lighting element 12. It is also envisioned that this cable (C) may be used to provide data transmissions to the at least one electronic device, to the at least one lighting element 12, or to a plurality of electronic devices. The cable retention arrangement 100 includes at least one cable opening 102 formed on or in at least a portion of the body 20 of the safety helmet 14. The at least one cable opening 102 is sized, shaped, or configured to allow or facilitate passage of the cable (C) therethrough for connection to at least one electronic device, e.g., the at least one lighting element 12.

In one preferred and non-limiting embodiment, the cable retention arrangement 100 includes at least one sleeve member 104 formed (such as by molding) on or attached to (such as by an adhesive) the body 20 of the safety helmet 14. This at least one sleeve member 104 is sized, shaped, or configured to retain and facilitate passage of the cable (C) therethrough. As shown in FIGS. 6 and 7, a plurality of sleeve members 104 is used to allow secure retention of the cable (C) around the outer surface 56 of the body 20 of the safety helmet 14, where this plurality of sleeve members 104 are spaced and aligned along a portion of the body 20 of the safety helmet 14. In addition, the openings in the sleeve members 104 may be oriented such that the cable (C) is "snaked" through the sleeve members (as shown in FIGS. 6 and 7), which provides further securing of the cable (C) with respect to the safety helmet 14. Accordingly, the cable retention arrangement 100 prevents the cable (C) from falling or sliding into the field of vision of the user, or otherwise causing an accidental cable entanglement with an external element in the working environment.

In this manner, provided is an improved support for a lighting element for a safety helmet, an improved adjustable lighting system for a safety helmet, and an improved cable retention arrangement for a safety helmet.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A support for mounting at least one lighting element on a safety helmet, the support comprising a body having: (i) at least one helmet attaching portion configured for directly or indirectly connecting the support to a portion of the safety helmet, and (ii) a plurality of lighting element attaching portions defined in and extending through the body of the support, the plurality of lighting element attaching portions configured for directly or indirectly connecting the at least one lighting element to the support, wherein at least two lighting element attaching portions of the plurality of lighting element attaching portions extend at different angles relative to a vertical axis extending through the body of the support so as to be configured to facilitate the attachment of the at least one lighting element in a corresponding plurality of positions, such that light projected from the at least one lighting element is focused or directed at a plurality of corresponding angles.

2. The support of claim 1, wherein the at least one helmet attaching portion comprises at least one slot configured to be removably attachable to at least one attachment structure formed on or attached to the safety helmet.

3. The support of claim 2, wherein the at least one slot is a substantially "T"-shaped slot arrangement defined by a center slot portion and two wing slot portions.

4. The support of claim 3, wherein the at least one attachment structure is a substantially "T"-shaped projection arrangement defined by a center portion and two wing portions, wherein the support is attachable to the safety helmet by aligning and sliding the "T"-shaped projection arrangement over and along the "T"-shaped slot arrangement.

5. The support of claim 2, wherein the at least one helmet attaching portion of the support comprises a step portion configured to contact an abutment portion of the at least one attachment structure, such that the at least one slot is positioned over and slid along at least a portion of the at least one attachment structure until the step portion contacts the abutment portion.

6. The support of claim 1, wherein the plurality of lighting element attaching portions comprise at least one slot extending at least partially through the body of the support, wherein the at least one slot is configured to receive a support attaching portion of the at least one lighting element at least partially therein, such that the at least one lighting element is removably attachable to the support.

7. The support of claim 1, wherein the plurality of lighting element attaching portions comprise:
   a first lighting element attaching portion configured to facilitate the attachment of the at least one lighting element in a first position, such that the light projected from the at least one lighting element is focused or directed at a first angle; and
   a second lighting element attaching portion configured to facilitate the attachment of the at least one lighting element in a second position, such that the light projected from the at least one lighting element is focused or directed at a second angle.

8. The support of claim 7, wherein the first angle is in the range of about 60° to about 80° with respect to the horizontal plane of vision, and the second angle is in the range of about 80° to about 90° with respect to the horizontal plane of vision.

9. The support of claim 7, wherein the first lighting element attaching portion comprises at least one first slot extending at least partially through the body of the support, wherein the at least one first slot is configured to receive a support attaching portion of the at least one lighting element at least partially therein, such that the at least one lighting element is removably attachable in the first position, and wherein the second lighting element attaching portion comprises at least one second slot extending at least partially through the body of the support, wherein the at least one second slot is configured to receive a support attaching portion of the at least one lighting element at least partially therein, such that the at least one lighting element is removably attachable in the second position.

10. The support of claim 1, wherein at least one of the plurality of lighting element attaching portions comprises at least one friction element configured to facilitate the retention of the at least one lighting element by the support.

11. The support of claim 1, wherein the helmet attaching portion further comprises at least one helmet attaching portion projection extending or projecting from a surface of the support and configured to at least partially interact with a corresponding notch on a surface of at least one attachment structure formed on or attached to the safety helmet, such that the when the support is attached to the at least one attachment structure, the at least one helmet attaching portion projection will at least partially fit into the corresponding notch, thereby retaining the support to the safety helmet via the at least one attachment structure, wherein at least one of the plurality of lighting element attaching portions comprises at least one slot extending at least partially through the body of the support, and wherein the at least one friction element comprises at least one friction element projection projecting from a surface at least partially defining the at least one slot.

12. An adjustable lighting system for a safety helmet having a body with an outer surface, the system comprising:
at least one lighting element configured to focus or direct light therefrom;
at least one attachment structure formed on or attached to the outer surface of the safety helmet; and
a support for the at least one lighting element, the support comprising a body having: (i) at least one helmet attaching portion configured for directly or indirectly connecting the support to the at least one attachment structure, and (ii) a plurality of lighting element attaching portions defined in and extending through the body of the support, the plurality of lighting element attaching portions configured for directly or indirectly connecting the at least one lighting element to the support, wherein at least two lighting element attaching portions of the plurality of lighting element attaching portions extend at different angles relative to a vertical axis extending through the body of the support so as to be configured to facilitate the attachment of the at least one lighting element in a corresponding plurality of positions, such that light projected from the at least one lighting element is focused or directed at a plurality of corresponding angles.

13. The system of claim 12, wherein the at least one attachment structure is formed or molded on the outer surface of the safety helmet.

14. The system of claim 12, wherein the at least one lighting element comprises a support attaching portion configured to interact with each of the plurality of lighting element attaching portions, such that the at least one lighting element is removably attachable between the plurality of positions on the support.

15. The system of claim 14, wherein the plurality of lighting element attaching portions comprise at least one slot extending at least partially through the body of the support, wherein the at least one slot is configured to receive the support attaching portion of the at least one lighting element at least partially therein, such that the at least one lighting element is removably attachable to the support.

16. The system of claim 15, wherein the support attaching portion comprises at least one projection configured to slide at least partially within the at least one slot.

17. A cable retention arrangement for a safety helmet having a body, the cable retention arrangement comprising at least one cable opening formed on or in at least a portion of the body of the safety helmet and configured to facilitate passage of the cable therethrough for connection to at least one electronic device and at least one sleeve member extending from an outer surface of the body of the safety helmet and configured to retain and facilitate passage of the cable therethrough.

18. The arrangement of claim 17, further comprising a plurality of sleeve members, wherein the plurality of sleeve members are spaced and aligned along a portion of the body of the safety helmet.

19. The arrangement of claim 17, wherein the at least one electronic device is at least one lighting element.

* * * * *

UNITED STATES PATENT AND TRADEMARK OFFICE
CERTIFICATE OF CORRECTION

PATENT NO. : 10,743,599 B2
APPLICATION NO. : 15/520512
DATED : August 18, 2020
INVENTOR(S) : Luciano Silva et al.

Page 1 of 1

It is certified that error appears in the above-identified patent and that said Letters Patent is hereby corrected as shown below:

In the Claims

Column 12, Line 32, Claim 17, after "formed" delete "on or"

Signed and Sealed this
Nineteenth Day of January, 2021

Andrei Iancu
*Director of the United States Patent and Trademark Office*